United States Patent Office 3,428,626
Patented Feb. 18, 1969

3,428,626
6α,7α - ETHYLENE AND 6α,7α - TETRAFLUORO-
ETHYLENE DRIVATIVES OF 4-PREGNENO-
[3,2-c]-PYRAZOLES
John H. Fried, Palo Alto, Calif., assignor to Syntex Corporation, Panama, Panama, a corporation of Panama
No Drawing. Filed Sept. 12, 1966, Ser. No. 578,501
U.S. Cl. 260—239.5         13 Claims
Int. Cl. C07c 173/10

This invention relates to novel cyclopentanophenanthrene derivatives and to a method for the preparation thereof. More specifically, this invention relates to 6α,7α-tetrafluoroethylene derivatives of 4-pregneno-[3,2-c]-pyrazoles. The compounds of the present invention are represented by the following formula:

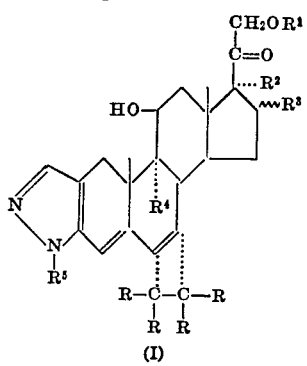

(I)

wherein each of R together is hydrogen or fluoro;
$R^1$ is hydrogen, tetrahydropyran-2-yl or a hydrocarbon carboxylic acyl group containing less than 12 carbon atoms;
$R^2$ is hydrogen, hydroxy or a hydrocarbon carboxylic acyloxy group containing less than 12 carbon atoms;
$R^3$ is hydrogen, α-methyl, β-methyl, α-hydroxy or an α-hydroxy carboxylic group containing less than 12 carbon atoms;
$R^2$ and $R^3$ together is the group $$\cdots O \diagdown\!\!\!\diagup P$$
$$\phantom{\cdots O}C$$
$$\cdots O \diagup\!\!\!\diagdown Q$$

in which P is hydrogen or lower alkyl and Q is hydrogen, alkyl or aryl of up to 8 carbon atoms;
$R^4$ is hydrogen or fluoro; and
$R^5$ is hydrogen, phenyl or p-fluorophenyl.
The compounds of Formula I, wherein $R^2$ is hydroxy and $R^3$ is hydrogen or methyl, are prepared in accordance with the following sequence:

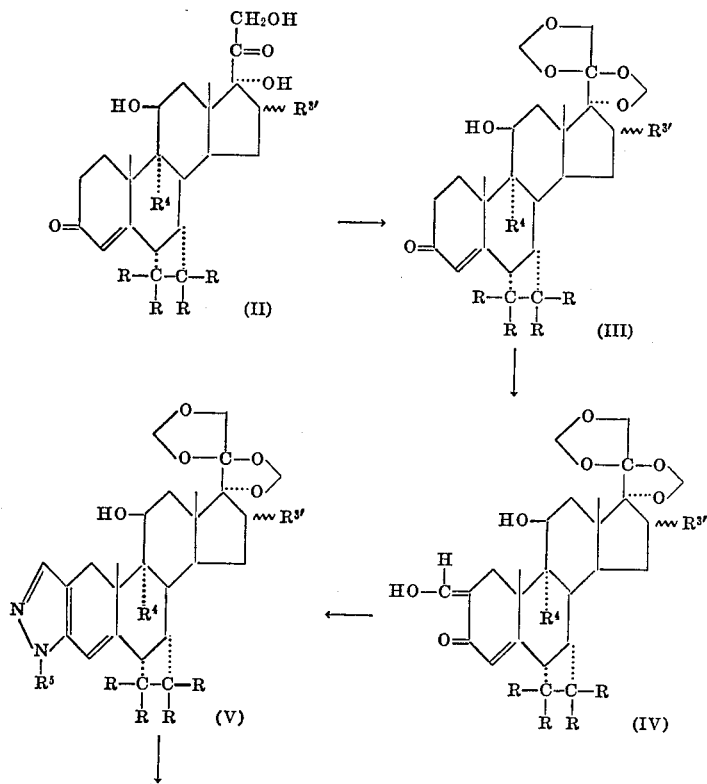

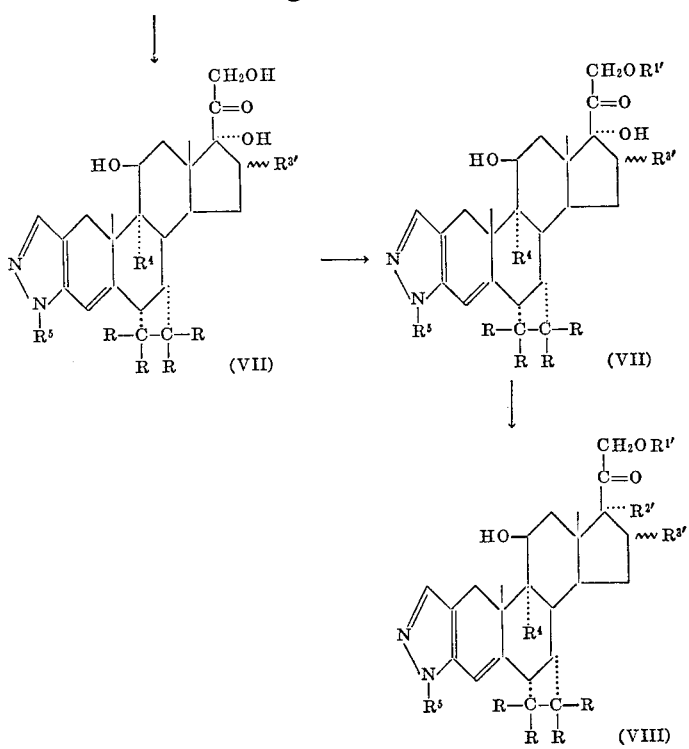

wherein

R¹' is tetrahydropyran-2'-yl or a hydrocarbon carboxylic acyl group containing less than 12 carbon atoms;
R²' is a hydrocarbon carboxylic acyloxy group containing less than 12 carbon atoms;
R³' is hydrogen or methyl; and
all other substituents are as defined hereinabove.

In the practice of preparing the above novel compounds of the present invention, a starting material of Formula II (prepared according to the procedure in copending application S.N. 544,710, filed Apr. 25, 1966, now abandoned), is allowed to react with formaldehyde in the presence of hydrochloric acid to form the corresponding 17,20;20,21-bismethylenedioxy compound of Formula III. A compound of Formula III is allowed to react with ethyl formate and sodium hydride in an inert atmosphere to yield the corresponding 2-hydroxymethylene compound of Formula IV. The 2-hydroxymethylene compound of Formula IV is then condensed with a molar equivalent of hydrazine hydrate, phenylhydrazine hydrochloride or p-fluorophenylhydrazine hydrochloride and a molar equivalent of sodium acetate in an aqueous methanolic solution at 0° C. to effect ring formation, thereby affording the corresponding 4-pregneno-[3,2-c]-pyrazole of Formula V. Subsequent to the formation of the pyrazole moiety, the 17,20;20,21-bismethylenedioxy protecting group is removed by allowing the latter to react with hydrofluoric acid, thereby providing a compound of Formula VI.

Additional elaborations at the 17α-hydroxy and/or 21-hydroxy groups are performed at this time by conventional techniques. Thus, treatment of the 21-hydroxy compound of Formula VI with dihydropyran in the presence of an acid catalyst such as p-toluenesulfonic acid or with a hydrocarbon carboxylic acid anhydride, such as acetic anhydride or the like, in the presence of pyridine, leads to the formation of the 21-tetrahydropyran-2'-yl or 21-acyl compounds of Formula VII. A 17α-hydroxy compound of Formula VII, wherein R¹' is preferably acetyl, is allowed to react with a hydrocarbon carboxylic acid anhydride in the presence of an acid catalyst such as p-toluenesulfonic acid to afford the corresponding 17α-acyloxy compound of Formula VIII.

The compounds of Formula I, wherein R² and R³ together is the group

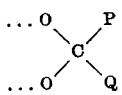

in which each of P and Q is as defined hereinabove, are prepared in accordance with the following sequence:

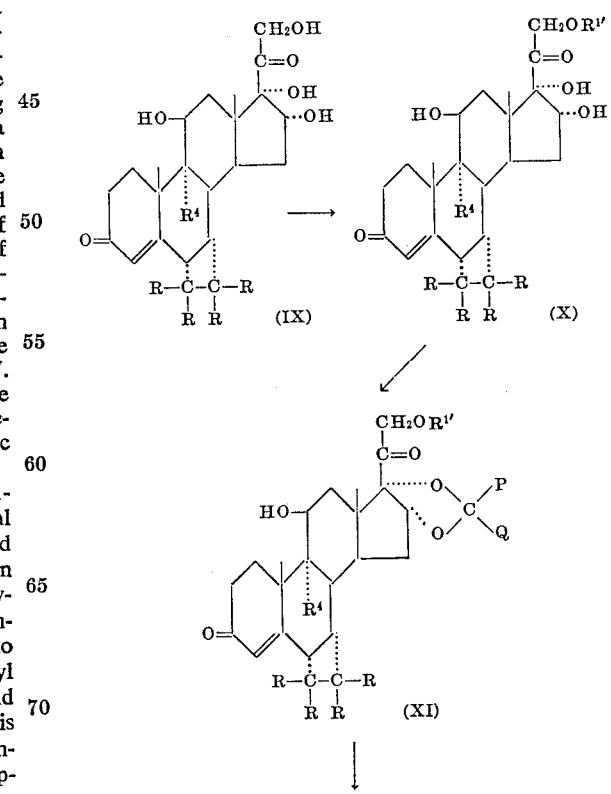

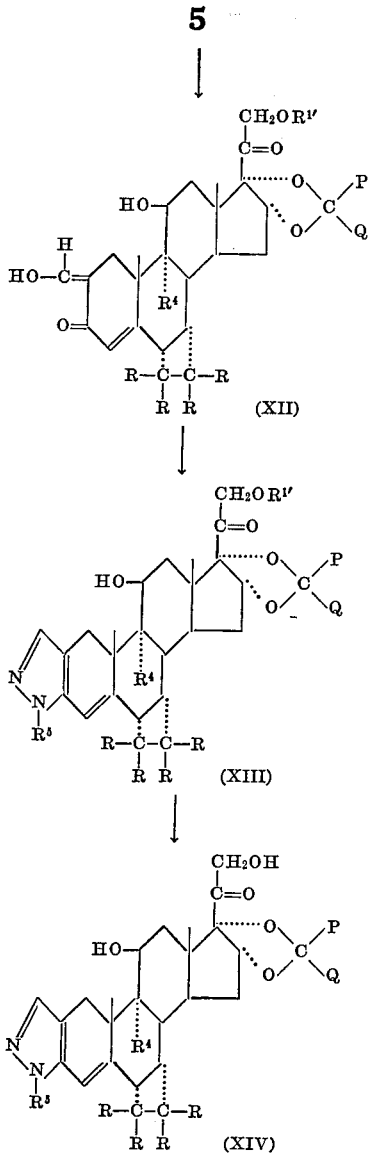

wherein R¹' is a hydrocarbon carboxylic acyl group of less than 12 carbon atoms; all other substituents are as defined hereinabove.

In the practice of preparing these novel compounds of the present invention, a starting material of Formula IX (prepared according to the procedure in copending application S.N. 544,710, filed Apr. 25, 1966), is allowed to react with a hydrocarbon carboxylic acid anhydride as described hereinbefore, to afford a 21-acyl compound of Formula X. The 16α,17α-diol compound of Formula X is then allowed to react with an aldehyde or ketone in the presence of perchloric acid to afford the corresponding acetal or ketal compounds of Formula XI. Preferably, acetone is allowed to react with the diol to afford the corresponding 16α,17α-isopropylidenedioxy compound of Formula XI, wherein each of P and Q is methyl.

Then, a compound of Formula XI is allowed to react with ethyl formate and sodium hydride in an inert atmosphere to yield the corresponding 2-hydroxymethylene compound of Formula XII. The latter compound of Formula XII is then condensed with a molar equivalent of hydrazine hydrate, phenylhydrazine hydrochloride or p-fluorophenylhydrazine hydrochloride and a molar equivalent of sodium acetate in an aqueous methanolic solution at 0° C. to effect ring formation, thereby providing the corresponding 4-pregneno-[3,2-c]-pyrazole of Formula XIII. A 21-hydroxy compound of Formula XIV is readily formed by mild basic hydrolysis of the 21-acyl compound of Formula XIII, such as by treatment with potassium carbonate in methanol at room temperature for a period of one hour.

The 6α,7α-ethylene and 6α,7α-tetrafluoroethylene derivatives of 4-pregneno-[3,2-c]-pyrazoles of Formula I are cortical hormones with high anti-inflammatory and low catabolic activities and are useful in the treatment of rheumatoid arthritis, contact dermatitis, allergies and the like. The novel compounds of Formula I are administered via usual routes, i.e. orally, topically or parenterally, in pharmaceutically acceptable compositions, and at dosage rates of from 0.5γ to 5 mg./kg./day. However, dosage rates below or above this range can also be used; the most favorable dosage rate and administration route being conditioned upon the purpose for which it is administered and the response thereto.

The following examples are set forth to illustrate but are not intended to limit the scope of the present invention.

EXAMPLE 1

To a solution of 5 g. of 6α,7α-ethylene-11β,17α,21-trihydroxypregn-4-en-3-one in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 6α,7α-ethylene-11β-hydroxy-17,20;20,21-bismethylenedioxypregn-4-en-3-one which is recrystallized from methanol:ether.

To a stirred solution of 3 g. of the latter compound in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-6α,7α-ethylene-11β-hydroxy-17,20;20,21-bismethylenedioxypregn-4-en-3-one which is recrystallized from methylene chloride:hexane.

A mixture of the 2-hydroxymethylene intermediate, 2 g. of sodium acetate, 100 ml. of aqueous methanol and 1 ml. of phenylhydrazine hydrochloride is allowed to stand under nitrogen at 0° C. for 24 hours. Acetic acid (2 ml.) is added and the mixture is allowed to stand for another four hours. The reaction mixture is diluted with ethyl acetate and washed with 2 N sodium hydroxide and water. The ethyl acetate extracts are dried, concentrated and chromatographed over silica, eluting with benzene, to afford 6α,7α-ethylene-11β-hydroxy-17,20;20,21-bismethylenedioxy-2'-phenyl-4-pregneno-[3,2-c]-pyrazole.

A suspension of 1 g. of the latter compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane: ethyl acetate to yield 6α,7α-ethylene-11β,17α,21-trihydroxy-2'-phenyl-4-pregneno-[3,2-c]-pyrazole which may be further purified through recrystallization from isopropanol.

In a similar fashion, using the above procedure, the following starting materials, namely:

6α,7α-tetrafluoroethylene-11β,17α,21-trihydroxypregn-4-en-3-one;

6α,7α-ethylene-9α-fluoro-11β,17α,21-trihydroxypregn-4-en-3-one; and

6α,7α-tetrafluoroethylene-16α-methyl-11β,17α,21-trihydroxypregn-4-en-3-one; are converted to the final products, namely;

6α,7α - tetrafluoroethylene - 11β,17α,21 - trihydroxy - 2'-phenyl-4-pregneno-[3,2-c]-pyrazole;

6α,7α - ethylene - 9α - fluoro - 11β,17α,21 - trihydroxy-2'-phenyl-4-pregneno-[3,2-c]-pyrazole; and 6α,7α-tetrafluoroethylene-16α-methyl - 11β,17α,21 - trihydroxy-2'-phenyl-4 - pregneno-[3,2-c]-pyrazole, respectively.

Utilizing the same procedure and starting materials with one exception, namely, substituting an equivalent amount of p-fluorophenylhydrazine hydrochloride in place of the phenylhydrazine hydrochloride, there are obtained the corresponding 2'-(p-fluorophenyl-4-pregneno-[3,2-c]-pyrazoles.

Again utilizing the same procedure and starting materials with one exception, namely substituting an equivalent amount of hydrazine hydrate in place of the phenylhydrazine hydrochloride, there are obtained the corresponding 4-pregneno-[3,2-c]-pyrazoles.

EXAMPLE 2

A mixture of 1 g. of 6α,7α-ethylene-9α-fluoro-11β,17α,21-trihydroxy-2'-phenyl-4-pregneno - [3,2-c] - pyrazole, 4 ml. of pyridine and 2 ml. of acetic anhydride is allowed to stand at room temperature for 15 hours. The mixture is then poured into ice water and the solid which forms is collected by filtration, washed with water and dried to yield 6α,7α-ethylene-9α-fluoro-11β,17α-dihydroxy - 21-acetoxy-2'-phenyl-4-pregneno-[3,2-c]-pyrazole which may be further purified through recrystallization from acetone:hexane.

In a similar fashion, by utilizing the same procedure, the 21-hydroxy compounds prepared in Example 1 are converted to their 21-acetates.

EXAMPLE 3

Two milliliters of dihydropyran are added to a solution of 1 g. of 6α,7α-tetrafluoroethylene - 11β,17α,21 - trihydroxy-2'-p-fluorophenyl-4-pregneno-[3,2 - c] - pyrazole in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 6α,7α-tetrafluoroethylene-11β,17α-dihydroxy-21-tetrahydropyran-2'-yloxy-2'' - p-fluorophenyl - 4 - pregneno-[3,2-c]-pyrazole which is recrystallized from pentane.

In a similar fashion,

6α,7α-ethylene-9α-fluoro-16α-methyl-11β,17α,21-trihydroxy-2'-phenyl-4-pregneno-[3,2-c]-pyrazole is converted to 6α,7α-ethylene-9α-fluoro-16α-methyl-11β,17α-dihydroxy-21-tetrahydropyran-2'-yloxy-2'''-phenyl-4-pregneno-[3,2-c]-pyrazole.

EXAMPLE 4

A mixture of 1 g. of 6α,7α-ethylene-11β,16α,17α-21-tetrahydroxypregn-4-en-3-one, 4 ml. of pyridine and 2 ml. of acetic anhydride is allowed to stand at room temperature for 15 hours. The mixture is then poured into ice water and the solid which forms is collected by filtration, washed with water and dried to yield 6α,7α-ethylene-11β, 16α,17α-trihydroxy - 21 - acetoxypregn-4-en-3-one which may be further purified through recrystallization from acetone:hexane.

To 120 ml. of acetone containing 1 g. of the latter compound are added 30 drops of 70% perchloric acid. The mixture is allowed to stand one hour at room temperature, 30 drops of pyridine are added and the solution is evaporated to dryness under reduced pressure. Thirty milliliters of water are added to the residue and this mixture is extracted several times with ethyl acetate.

The combined extracts are washed to neutrality with water, dried over sodium sulfate and evaporated to dryness. The residue upon trituration with methanol yields 6α,7α-ethylene-11β-hydroxy-16α,17α-isopropylidenedioxy-21-acetoxypregn-4-en-3-one which is recrystallized from methanol.

To a stirred solution of 3 g. of the latter compound in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-6α,7α-ethylene - 11β - hydroxy - 16α,17α - isopropylidenedioxy - 21-acetoxypregn-4-en-3-one which is recrystallized from methylene chloride:hexane.

A mixture of the 2-hydroxymethylene intermediate, 2 g. of sodium acetate, 100 ml. of aqueous methanol and 1 ml. of phenylhydrazine hydrochloride is allowed to stand under nitrogen at 0° C. for 24 hours. Acetic acid (2 ml.) is added and the mixture is allowed to stand for another four hours. The reaction mixture is diluted with ethyl actate and washed with 2 N sodium hydroxide and water. The ethyl acetate extracts are dried, concentrated and chromatographed over silica, eluting with benzene, to afford 6α,7α - ethylene - 11β - hydroxy - 16α,17α - isopropylidenedioxy - 21 - acetoxy - 2' - phenyl - 4 - pregneno-[3,2-c]-pyrazole.

Utilizing the above procedure, the following starting materials, namely

6α,7α-tetrafluoroethylene-9α-fluoro-11β,16α,17α,21-tetrahydroxypregn-4-en-3-one; and 6α,7α-ethylene-9α-fluoro-11β,16α,17α,21-tetrahydroxypregn-4-en-3-one; are converted to the final products, namely:

6α,7α-tetrofluoroethylene-11β-hydroxy-16α,17α-isopropylidenedioxy-21-acetoxy-2'-phenyl-4-pregneno-[3,2-c]-pyrazole; and 6α,7α-ethylene-9α-fluoro-11β-hydroxy-16α,17α-isopropylidenedioxy-21-acetoxy-2'-phenyl-4-pregneno-[3,2-c]-pyrazole, respectively.

Utilizing the same procedure and starting materials with one exception, namely substituting an equivalent amount of p-fluorophenylhydrazine hydrochloride in place of the phenylhydrazine hydrochloride, there are obtained the corresponding 2'-(p-fluorophenyl)-4-pregneno-[3,2-c]-pyrazoles.

Again utilizing the same procedure and starting materials with one exception, namely substituting an equivalent amount of hydrazine hydrate in place of the phenylhydrazine hydrochloride, there are obtained the corresponding 4-pregneno-[3,2-c]-pyrazoles.

What is claimed is:

1. A compound having the following formula:

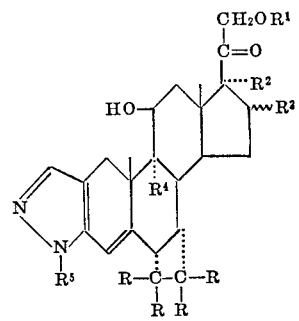

wherein each of R together is hydrogen or fluoro;

$R^1$ is hydrogen, tetrahydropyran-2-yl or a hydrocarbon carboxylic acyl group containing less than 12 carbon atoms;

$R^2$ is hydrogen, hydroxy or a hydrocarbon carboxylic acyloxy group containing less than 12 carbon atoms;

$R^3$ is hydrogen, α-methyl, β-methyl, α-hydroxy or an α-hydroxy carboxylic group containing less than 12 carbon atoms;

$R^2$ and $R^3$ together is the group

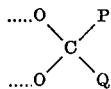

in which P is hydrogen or lower alkyl and Q is hydrogen, alkyl or aryl of up to 8 carbon atoms;

$R^4$ is hydrogen or fluoro; and $R^5$ is hydrogen, phenyl or p-fluorophenyl.

2. A compound according to claim 1 wherein each of R is hydrogen; $R^1$ is hydrogen; $R^2$ is hydroxy; $R^3$ is α-methyl; and $R^5$ is hydrogen.

3. A compound according to claim 1 wherein each of R is hydrogen; $R^1$ is hydrogen; $R^2$ is hydroxy; $R^3$ is α-methyl; and $R^5$ is phenyl.

4. A compound according to claim 1 wherein each of R is hydrogen; $R^1$ is hydrogen; $R^2$ is hydroxy; $R^3$ is α-methyl; and $R^5$ is p-fluorophenyl.

5. A compound according to claim 1 wherein each of R is fluoro; $R^1$ is hydrogen; $R^2$ is hydroxy; $R^3$ is α-methyl; and $R^5$ is hydrogen.

6. A compound according to claim 1 wherein each of R is fluoro; $R^1$ is hydrogen; $R^2$ is hydroxy; $R^3$ is α-methyl; and $R^5$ is phenyl.

7. A compound according to claim 1 wherein each of R is fluoro; $R^1$ is hydrogen; $R^2$ is hydroxy; $R^3$ is α-methyl; and $R^5$ is p-fluorophenyl.

8. A compound according to claim 1 wherein each of R is hydrogen; $R^1$ is hydrogen; $R^2$ and $R^3$ together is the group

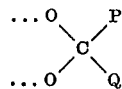

in which each of P and Q is methyl; and $R^5$ is hydrogen.

9. A compound according to claim 1 wherein each of R is hydrogen; $R^1$ is hydrogen; $R^2$ and $R^3$ together is the group

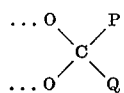

in which each of P and Q is methyl; and $R^5$ is phenyl.

10. A compound according to claim 1 wherein each of R is hydrogen; $R^1$ is hydrogen; $R^2$ and $R^3$ together is the group

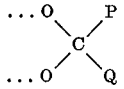

in which each of P and Q is methyl; and $R^5$ is p-fluorophenyl.

11. A compound according to claim 1 wherein each of R is fluoro; $R^1$ is hydrogen; $R^2$ and $R^3$ together is the group

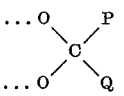

in which each of P and Q is methyl; and $R^5$ is hydrogen.

12. A compound according to claim 1 wherein each of R is fluoro; $R^1$ is hydrogen; $R^2$ and $R^3$ together is the group

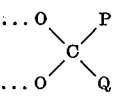

in which each of P and Q is methyl; and $R^5$ is phenyl.

13. A compound according to claim 1 wherein each of R is fluoro; $R^1$ is hydrogen; $R^2$ and $R^3$ together is the group

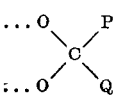

in which each of P and Q is methyl; and $R^5$ is p-fluorophenyl.

No references cited.

HENRY A. FRENCH, *Primary Examiner.*

U.S. Cl. X.R.

167—65; 260—239.55, 397.45